United States Patent
Marchione

(10) Patent No.: US 9,476,304 B2
(45) Date of Patent: Oct. 25, 2016

(54) LASER CASTING BLADE REPAIR

(71) Applicant: CATERPILLAR INC., Peoria, IL (US)

(72) Inventor: Thierry Andre Marchione, Edgewood, NM (US)

(73) Assignee: Caterpillar Inc., Peoria, IL (US)

( * ) Notice: Subject to any disclaimer, the term of this patent is extended or adjusted under 35 U.S.C. 154(b) by 805 days.

(21) Appl. No.: 13/892,058

(22) Filed: May 10, 2013

(65) Prior Publication Data

US 2014/0334936 A1  Nov. 13, 2014

(51) Int. Cl.
| | |
|---|---|
| F01D 5/00 | (2006.01) |
| B23P 6/00 | (2006.01) |
| B23K 9/04 | (2006.01) |
| B23K 9/167 | (2006.01) |
| B23K 10/02 | (2006.01) |

(52) U.S. Cl.
CPC .............. F01D 5/005 (2013.01); B23K 9/044 (2013.01); B23K 9/167 (2013.01); B23K 10/027 (2013.01); B23K 26/342 (2015.10); B23P 6/007 (2013.01); B23K 2201/001 (2013.01); F05D 2220/40 (2013.01); F05D 2230/21 (2013.01); F05D 2230/211 (2013.01); Y10T 29/49318 (2015.01)

(58) Field of Classification Search
CPC ......... F01D 5/00; F01D 5/005; B23K 26/34; B23P 6/00; B23P 6/002; B23P 6/007; B23P 6/0456
See application file for complete search history.

(56) References Cited

U.S. PATENT DOCUMENTS

| | | | |
|---|---|---|---|
| 3,103,721 A * | 9/1963 | Bishop .................. | B23K 23/00 164/53 |
| 3,550,259 A * | 12/1970 | Smith .................. | B23K 25/005 219/73 |
| 4,657,171 A * | 4/1987 | Robins .................. | B23K 9/04 228/119 |
| 4,841,117 A * | 6/1989 | Koromzay ............... | B23K 9/04 219/76.1 |
| 4,958,431 A | 9/1990 | Clark et al. | |
| 5,038,014 A * | 8/1991 | Pratt .................... | B22F 3/1055 219/121.64 |
| 5,701,669 A | 12/1997 | Meier | |
| 5,743,322 A | 4/1998 | Jackson et al. | |
| 5,914,059 A * | 6/1999 | Marcin, Jr. ............ | B23P 6/007 148/525 |
| 6,300,591 B1 * | 10/2001 | Fuerschbach ........ | B23K 26/242 219/121.64 |
| 6,326,585 B1 | 12/2001 | Aleshin et al. | |
| 6,542,843 B1 * | 4/2003 | Metzinger ............... | B23P 6/002 702/113 |
| 7,009,137 B2 | 3/2006 | Guo | |
| 7,690,112 B2 | 4/2010 | Bostanjoglo et al. | |
| 7,797,828 B2 | 9/2010 | Beeson et al. | |

(Continued)

FOREIGN PATENT DOCUMENTS

| | | |
|---|---|---|
| DE | 19547903 C1 | 3/1997 |
| DE | 102004002551 A1 | 8/2005 |

(Continued)

*Primary Examiner* — Eric Keasel
*Assistant Examiner* — Joshua R Beebe
(74) *Attorney, Agent, or Firm* — Procopio, Cory, Hargreaves & Savitch LLP

(57) ABSTRACT

A method for repairing a rotor wheel including an airfoil using a blade repair assembly is disclosed. The blade repair assembly includes a first block and a second block, each including a contact surface with a shape of at least a portion of the airfoil and a cavity surface adjacent the contact surface. The method includes pre-machining an airfoil edge to a uniform height. The method also includes clamping the first block and the second block to the airfoil forming a cavity with the cavity surfaces and the airfoil edge. The method also includes filling the cavity with a metal including metallurgically bonding the metal to the airfoil.

17 Claims, 4 Drawing Sheets

(56) References Cited

U.S. PATENT DOCUMENTS

| | | | |
|---|---|---|---|
| 8,257,049 B2 | 9/2012 | Yelistratov et al. | |
| 2003/0170120 A1* | 9/2003 | Grunke | F01D 5/20 415/174.4 |
| 2009/0196762 A1* | 8/2009 | Koga | B22D 15/005 416/241 R |
| 2009/0241339 A1* | 10/2009 | Hasselberg | B23K 9/046 29/889.1 |

FOREIGN PATENT DOCUMENTS

| | | |
|---|---|---|
| EP | 276404 A1 | 8/1988 |
| EP | 558870 A1 | 9/1993 |
| EP | 562130 A1 | 9/1993 |
| EP | 634217 A1 | 1/1995 |
| JP | 10180442 A | 7/1998 |
| RU | 2177863 C1 | 1/2002 |

* cited by examiner

LASER CASTING BLADE REPAIR

TECHNICAL FIELD

The present disclosure generally pertains to the repair of rotor blades, and is more particularly directed toward the repair or remanufacture of turbocharger compressor and turbine blades.

BACKGROUND

A turbocharger typically includes a compressor and a turbine section. During operation of a turbocharger, the blades for the compressor wheel of the compressor and for the turbine wheel of the turbine may become damaged. The compressor and turbine blades may be repaired, effectively extending the service life of the compressor and turbine blades.

U.S. Pat. No. 4,958,431 to R. Clark discloses a more creep resistant turbine rotor and novel methods for repairing worn surfaces of Cr—Mo—V steam turbine components. These methods include specified alloy compositions and welding procedures that minimize weld stresses and cracking. These alloys exhibit improved creep and fatigue properties and are preferably deposited using a gas tungsten arc welding procedure. Bead, sequencing, cooling side plates and the use of run-off tabs are also disclosed for minimizing welding defects in turbine rotors and discs.

The present disclosure is directed toward overcoming one or more of the problems discovered by the inventors.

SUMMARY OF THE DISCLOSURE

A method for repairing a rotor wheel airfoil including an airfoil edge using a blade repair assembly is disclosed. The blade repair assembly has a first block including a first contact surface with a shape of at least a portion of the airfoil and a first cavity surface adjacent the first contact surface. The blade repair assembly also has a second block including a second contact surface with a shape of at least a portion of the airfoil and a second cavity surface adjacent the second contact surface. The first block and the second block each include a thermal diffusivity of at least one-hundred millimeters squared per second. The method includes pre-machining the airfoil edge to a uniform height. The method also includes clamping the first block and the second block to the airfoil forming a cavity with the first cavity surface, the second cavity surface, and the airfoil edge. The method also includes filling the cavity with a metal. Filling the cavity with the metal includes melting the metal and metallurgically bonding the metal to the airfoil forming a bonded portion. The method further includes unclamping the first block and the second block from the airfoil.

A remanufactured rotor wheel is also disclosed. The remanufactured rotor wheel includes a hub and an airfoil. The hub includes an axial portion that curves to a radial portion. The airfoil extends from the hub. The airfoil includes an airfoil tip and a bonded portion metallurgically bonded to the airfoil tip. The bonded portion includes a first side extending from the airfoil tip at a first angle. The first angle corresponds to an angle of a first cavity surface for a first block of a blade repair assembly. The bonded portion also includes a second side extending from the airfoil tip at a second angle. The second angle corresponds to an angle of a second cavity surface for a second block of a blade repair assembly.

DETAILED DESCRIPTION

The systems and methods disclosed herein include a blade repair assembly with a first block and a second block formed of copper, a copper alloy, or a material with a thermal diffusivity above 100 millimeters squared per second and a reflectivity of above 95 percent. Each block includes a contact surface and a cavity surface. In embodiments, an airfoil edge of the rotor blade to be repaired is pre-machined to uniform height and clamped between the contact surfaces. The airfoil edge and the cavity surfaces form a cavity that may act as a mold for the volume of material to be rebuilt at the airfoil edge. The cavity is filled with a melted metal that is metallurgically bonded to the airfoil. The melted metal may be metallurgically bonded to the airfoil with a laser. The amount or volume of material metallurgically bonded to the airfoil may be determined or controlled by the angle of the cavity surfaces. The thermal diffusivity and reflectivity of the blocks may prevent the first block and the second block from welding or metallurgically bonding with the airfoil or the metal material.

Figure 1:
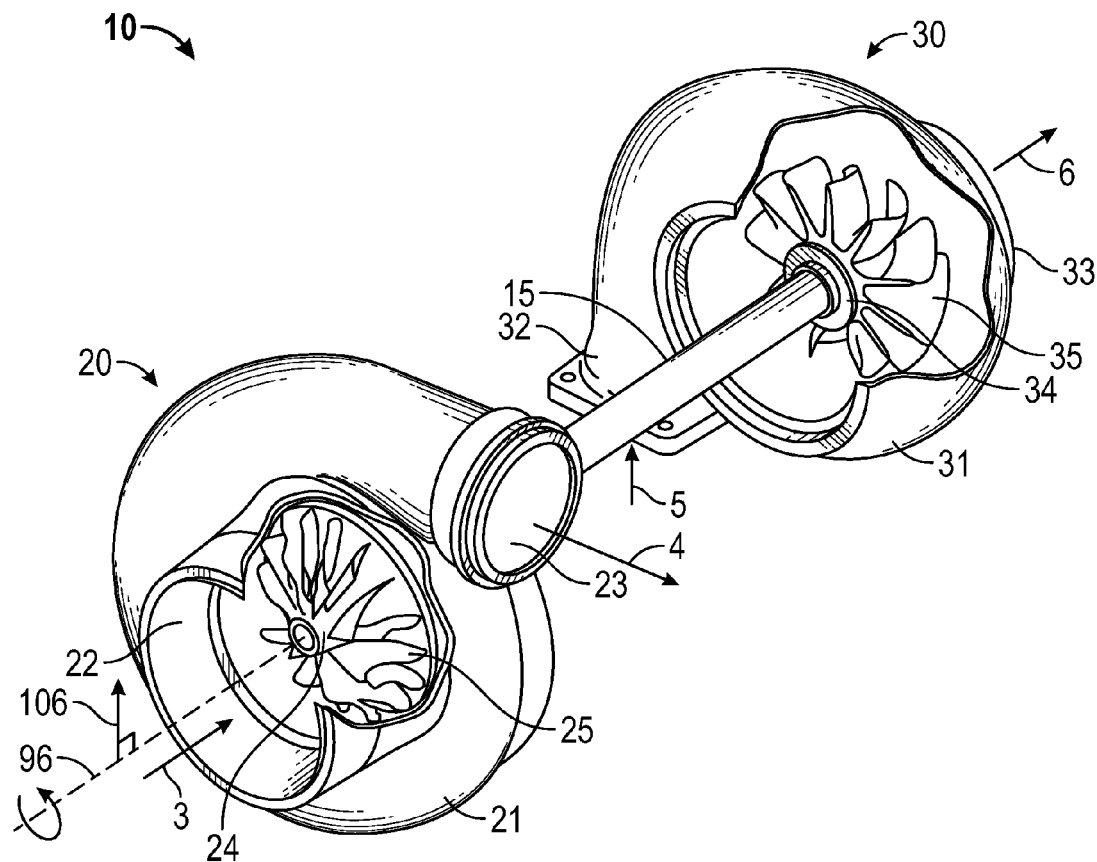
FIG. 1 is a perspective view of the main components of a typical turbocharger.

FIG. 1 is a perspective view of the main components of a typical turbocharger 10. Some of the surfaces have been left out or exaggerated for clarity and ease of explanation. Also, the disclosure may generally reference a center axis 105 of rotation of the turbocharger 10, which may be generally defined by the longitudinal axis of its shaft 15. The center axis 105 may be common to or shared with various other concentric components. All references to radial, axial, and circumferential directions and measures refer to center axis 105, unless specified otherwise, and terms such as "inner" and "outer" generally indicate a lesser or greater radial distance from, wherein a radial 106 may be in any direction perpendicular and radiating outward from center axis 105.

Turbocharger 10 includes a compressor section 20 and a turbine section 30 connected by a shaft 15. The compressor section 20 includes compressor housing 21 and compressor wheel 24. Compressor housing 21 includes air inlet 22 and air outlet 23. Air inlet 22 may be an axial inlet, while air outlet 23 may extend in a radial or circumferential direction. Compressor wheel 24 is housed within compressor housing 21 and couples to shaft 15. As illustrated, compressor wheel 24 is a radial rotor assembly. Compressor wheel 24 includes multiple compressor airfoils 25, which may be integral to compressor wheel 24.

Turbine section 30 includes turbine housing 31 and turbine rotor 34. Turbine housing 31 includes exhaust inlet 32 and exhaust outlet 33. Exhaust inlet 32 may be a radial or circumferential inlet, while exhaust outlet 33 may be an axial outlet. Turbine rotor 34 is housed within turbine housing 31 and couples to shaft 15. Turbine rotor 34 and compressor wheel 24 may couple to shaft 15 at opposite ends. As illustrated, turbine rotor 34 is a radial rotor assembly. Turbine rotor 34 includes multiple turbine airfoils 35, which may be integral to turbine rotor 34.

Figure 2:
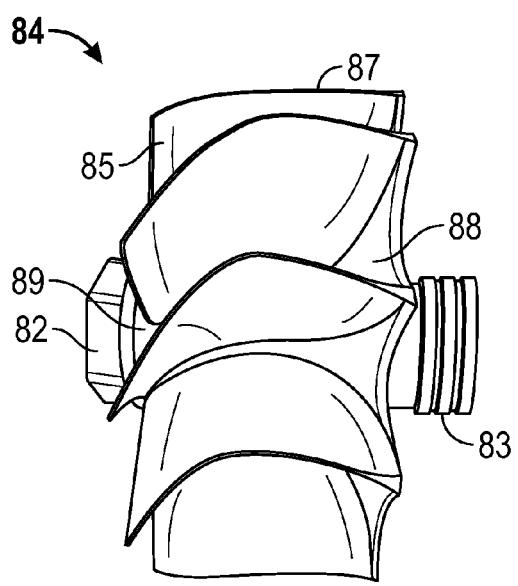
FIG. 2 is a perspective view of a rotor wheel for the turbocharger of FIG. 1.

FIG. 2 is a perspective view of an embodiment of a rotor wheel 84 with integral airfoils 85 for the turbocharger of FIG. 1. Rotor wheel 84 may be a compressor wheel 24 or a turbine rotor 34. Rotor wheel 84 may include a hub 82, integral airfoils 85, and rear hub extension 83. Hub 82 is the central portion of rotor wheel 84 that curves from an axial portion 89 to a radial portion 88. Axial portion 89 is oriented for air to either enter (for a compressor wheel 24) or exit (for a turbine rotor 34) in an axial direction, and radial portion 88 is oriented for air to either exit (for compressor wheel 24) or enter (for turbine rotor 34) in a radial direction.

Integral airfoils 85 may extend radially outward from hub 82. Each integral airfoil 85 includes an integral airfoil edge 87. Integral airfoil edge 87 may be an outer radial tip of integral airfoil 85, a leading edge (for a compressor wheel 24) of integral airfoil 85, or a trailing edge (for a turbine rotor 34) of integral airfoil 85. While a rotor wheel 84 for a turbocharger is described herein, the description may also apply to the rotor wheel 84 of other industrial machines, such as centrifugal gas compressors.

Figure 3:
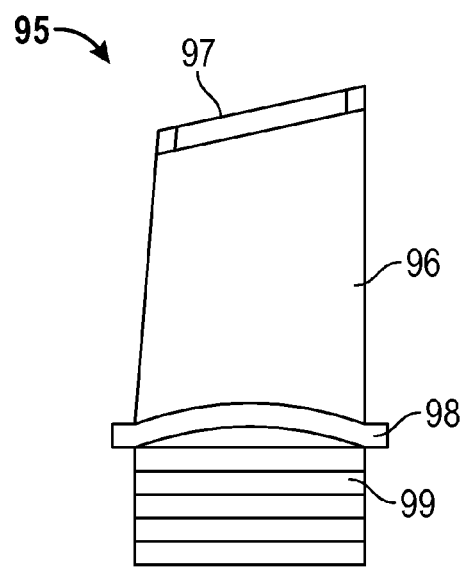
FIG. 3 is a perspective view of a removable rotor blade.

FIG. 3 is a perspective view of a removable rotor blade 95. In some embodiments, compressor wheel 24 or turbine rotor 34 may include removable rotor blades 95. Each rotor blade 95 may include rotor airfoil 96, platform 98, and blade root 99. Rotor airfoil 96 may extend from platform 98. Rotor airfoil 96 includes rotor airfoil tip 97 at the end of rotor airfoil 96 opposite platform 98. Blade root 99 may extend from platform 98 in the direction opposite rotor airfoil 96. Blade root 99 may include a dovetail or fir tree shape configured to couple to either compressor wheel 24 or turbine rotor 34. While a rotor blade 95 for a turbocharger is described herein, the description may also apply to the rotor blades of other industrial machines, such as gas turbine engines.

One or more of the above components (or their subcomponents) may be made from aluminum, stainless steel, titanium, titanium alloys and/or superalloys, including nickel based alloys. A superalloy, or high-performance alloy, is an alloy that exhibits excellent mechanical strength and creep resistance at high temperatures, good surface stability, and corrosion and oxidation resistance.

Figure 4:
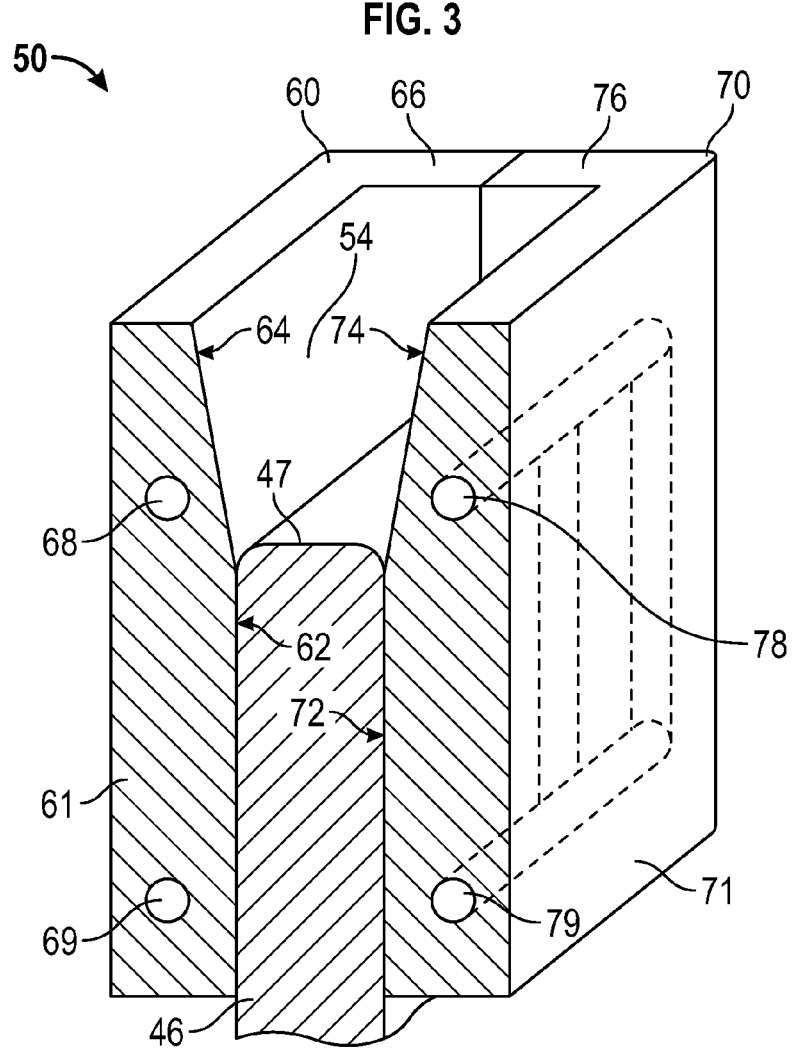
FIG. 4 is a cross-section of a perspective view of the blade repair assembly coupled to an airfoil, such as the integral airfoil of the rotor wheel of FIG. 2.

Damaged or worn airfoils, such as compressor airfoils 25 and turbine airfoils 35 may be repaired or remanufactured to extend the life of the compressor airfoils 25 and turbine airfoils 35. FIG. 4 is a cross-sectional view of the blade repair assembly 50 coupled to an airfoil 46 such as an integral airfoil 85 of the rotor wheel 84 of FIG. 2. Blade repair assembly 50 includes first block 60 and second block 70. First block 60 may include first block side 61, first block forward end 65, first contact surface 62, and first cavity surface 64.

First block side 61 may have a curvature similar to airfoil 46. First block side 61 may include a first side inlet channel 68 and a first side outlet channel 69. First side inlet channel 68 and first side outlet channel 69 each extend within first block side 61. First side inlet channel 68 may be parallel to first side outlet channel 69. First side inlet channel 68 and first side outlet channel 69 may be connected by multiple cooling channels. In the embodiment depicted in FIG. 4, first side inlet channel 68 and first side outlet channel 69 extend parallel across first block side 61 with multiple transverse cooling channels extending there between, with first side inlet channel 68 being located above first side outlet channel 69. In other embodiments, multiple inlet channels and outlets may be used in varying directions and orientations.

First block forward end 65 may extend from first block side 61 towards second block 70. First contact surface 62 contacts a first side of airfoil 46 and may include the same or similar curvature as the first side of airfoil 46. First cavity surface 64 extends from first contact surface 62. First contact surface 62 and first cavity surface 64 may be the inner surfaces of first block side 61 and first block forward end 65, the surfaces facing toward airfoil 46 and second block 70.

Second block 70 may include second block side 71, second block forward end 75, second contact surface 72, and second cavity surface 74.

Second block side 71 may have a curvature similar to airfoil 46. Second block side 71 may include a second side inlet channel 78 and a second side outlet channel 79. Second side inlet channel 78 and second side outlet channel 79 each extend within second block side 71. Second side inlet channel 78 may be parallel to second side outlet channel 79. Second side inlet channel 78 and second side outlet channel 79 may be connected by multiple cooling channels. In the embodiment depicted in FIG. 4, second side inlet channel 78 and second side outlet channel 79 extend parallel across second block side 71 with multiple transverse cooling channels extending there between, with second side inlet channel 78 being located above second side outlet channel 79. In other embodiments, multiple inlet channels and outlets may be used in varying directions and orientations.

Second block forward end 75 may extend from second block side 71 towards second block 70. Second contact surface 72 contacts a second side of airfoil 46 and may include the same or similar curvature as the second side of airfoil 46. Second cavity surface 74 extends from second contact surface 72. Second contact surface 72 and second cavity surface 74 may be the inner surfaces of second block side 71 and second block forward end 75, the surfaces facing toward airfoil 46 and first block 60.

First contact surface 62 and second contact surface 72 may form a mold that fits around all or a portion of airfoil 46 or may form the negative shape of all or a portion of airfoil 46. In the embodiment illustrated in FIG. 4, first cavity surface 64 extends from first contact surface 62 adjacent airfoil edges 47 and second cavity surface 74 extends from second contact surface 72 adjacent airfoil edge 47. Airfoil edge 47 may be an airfoil tip or edge such as integral airfoil edge 87 or rotor airfoil tip 97. First cavity surface 64 and second cavity surface 74 may extend from first contact surface 62 and second contact surface 72 prior to or after airfoil edge 47. First cavity surface 64 and second cavity surface 74 may diverge outward, or incline from airfoil edge or from each other as they extend from first contact surface 62 and second contact surface 72.

Figure 5:
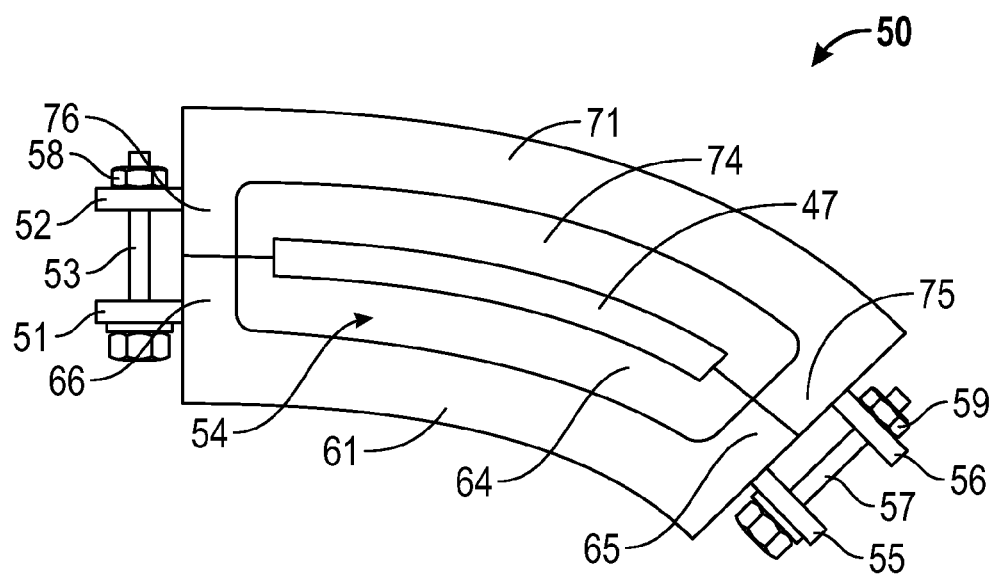
FIG. 5 is a top view of the blade repair assembly of FIG. 4.

FIG. 5 is a top view of the blade repair assembly 50 of FIG. 4. As illustrated in FIG. 5, first block 60 may also include first block aft end 66 and second block 70 may also include second block aft end 76. First block aft end 66 extends from first block side 61 toward second block aft end 76, and second block aft end 76 extends from second block side 71 toward first block aft end 66. Similarly, first block forward end 65 may extend toward second block forward end 75, and second block forward end 75 may extend toward first block forward end 65. In the embodiment illustrated, first block forward end 65 and second block forward end 75 contact and form a seal at the forward end of airfoil 46, and first block aft end 66 and second block aft end 76 contact and form a seal at the aft end of airfoil 46.

First contact surface 62 and first cavity surface 64 may also include the inner surfaces of first block aft end 66, and second contact surface 72 and second cavity surface 74 may also include the inner surfaces of second block aft end 76.

Referring to FIGS. 4 and 5, first cavity surface 64 and second cavity surface 74 are configured to form a cavity 54 with airfoil edge 47. First cavity surface 64 and second cavity surface 74 may be configured to extend completely around airfoil edge 47. The size of cavity 54 may be determined by the angles of first cavity surface 64 and second cavity surface 74. The size of cavity 54 may determine the amount of material added to airfoil 46 at airfoil edge 47 in the method described below.

Blade repair assembly 50 may include a clamping mechanism, jig, or other device for holding first block 60 and second block 70 securely to airfoil 46. In the embodiment illustrated in FIG. 5, first block 60 includes a first block forward tab 51 and a first block aft tab 55, and second block 70 includes a second block forward tab 52 and a second block aft tab 56. First block forward tab 51 may extend from first block forward end 65 and second block forward tab 52 may extend from second block forward end 75. First block forward tab 51 and second block forward tab 52 may be aligned. A fastener, such as a forward bolt 53 may extend through first block forward tab 51 and second block forward tab 52. Forward bolt 53 may be secured in place with forward nut 58.

Similarly, first block aft tab 55 may extend from first block aft end 66 and second block aft tab 56 may extend from second block aft end 76. First block aft tab 55 and second block aft tab 56 may be aligned. A fastener, such as aft bolt 57 may extend through first block aft tab 55 and second block aft tab 56. Aft bolt 57 may be secured in place with aft nut 59. First block 60 and second block 70 may be formed from copper, from a copper alloy, or from other materials with high thermal diffusivity and high reflectivity, the reflectivity being based on the wavelength of the laser used in the remanufacturing process. For example, in one embodiment, first block 60 and second block 70 have a thermal diffusivity above one-hundred millimeters squared per second (0.155 inches squared per second). In another embodiment, first block 60 and second block 70 have a thermal diffusivity above one-hundred and ten millimeters squared per second (0.171 inches squared per second). In some embodiments, first block 60 and second block 70 have a reflectivity of at least ninety-five percent. In another embodiment, first block 60 and second block 70 include a reflectivity of ninety-nine percent.

Blade repair assembly 50 may also include a liquid cooling assembly (not shown) to cool first block 60 and second block 70 during use. The liquid cooling assembly may use water or other liquids to cool first block 60 and second block 70. The liquid cooling assembly may be in flow communication with first side inlet channel 68, first side outlet channel 69, second side inlet channel 78, and second side outlet channel 79. The liquid cooling assembly may include a cooling liquid, tubing, a pump, and a liquid reservoir. The cooling liquid may be water. The tubing may connect the pump to the reservoir and to first side inlet channel 68 and second side inlet channel 78. Tubing may also connect first side outlet channel 69 and second side outlet channel 79 to the reservoir.

Figure 6:
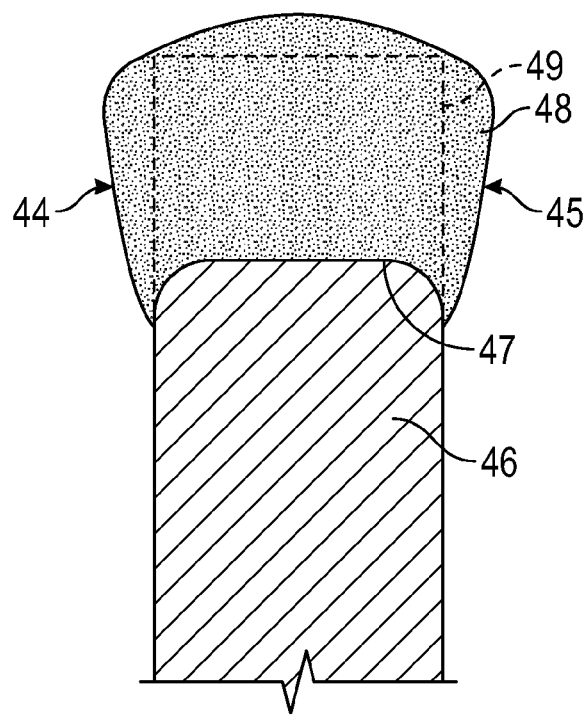
FIG. 6 is a side view of the airfoil of FIG. 4 with a rebuilt or remanufactured edge.

FIG. 6 is a side view of a portion of the airfoil 46 of FIG. 3 with a rebuilt or remanufactured edge. Airfoil 46 with a remanufactured edge includes a bonded portion 48 extending from airfoil edge 47. Bonded portion 48 may include first side 44 and second side 45. First side 44 and second side 45 may diverge. First side 44 extends from airfoil edge 47 at a first angle. The first angle may correspond to the angle of first cavity surface 64. Second side 44 extends from airfoil edge 47 at a second angle. The second angle may correspond to the angle of second cavity surface 74.

Bonded portion 48 may also include a forward side and an aft side (not shown). The forward side may extend from the forward or leading edge of airfoil edge 47 at a third angle. The aft side may extend from the aft or trailing edge of airfoil edge 47 at a fourth angle. The third and fourth angles may correspond to the angles of first cavity surface 64 and second cavity surface 74 as they extend around airfoil edge 47. The first angle, the second angle, the third angle, and the fourth angle may be the same or similar to one another. Bonded portion 48 may be thicker than airfoil edge 47. A grinding procedure may be used to reshape bonded portion 48 to a final airfoil profile 49 shown dashed.

INDUSTRIAL APPLICABILITY

Turbochargers may be suited for use in automobiles and in heavy duty vehicles. Turbochargers increase the mass of air supplied to an engine, resulting in improved engine performance. Referring to FIG. 1, exhaust inlet gas 5 enters exhaust inlet 32 of turbine housing 31 and powers (rotates) turbine rotor 34 before exiting exhaust outlet 33 as exhaust outlet gas 6. Turbine rotor 34 drives compressor wheel 24. Compressor wheel 24 draws ambient air 3 in through air inlet 22. Compressor wheel 24 compresses the air and directs compressed air 4 to air outlet 23. Air outlet 23 may be connected to the engine intake manifold. Compressed air 4 is then directed into the engine intake manifold and used for combustion. The combustion exhaust may be connected to exhaust inlet 32.

Compressor wheel 24 and turbine rotor 34 operate at very high speeds, often up to speeds between 90,000 revolutions per minute to 250,000 revolutions per minute. Compressor airfoils 25 and turbine airfoils 35 may be damaged during operation. The airfoils may be repaired or remanufactured to increase the operating life of compressor wheel 24 and turbine rotor 34.

The tips and edges of compressor airfoils 25 and turbine airfoils 35 may be relatively thin, making repair of the airfoils difficult and expensive. The tips and edges of the airfoils may be repaired by hand or by an automated process. With a hand process, the airfoil edge or tip may be distorted by a grinding process used to strip down the part or by the heat from the weld; the airfoil edge or tip may also be overbuilt during welding, resulting in increased machining times as the materials used for compressor airfoils 25 and turbine airfoils 35 may be difficult to machine.

Automated processes may require the use of expensive machinery with a complex tool path. For example, the automated process may need machinery to ensure that it follows the airfoil edge or tip and may need to identify the start and end points for the welding process. If laser cladding is used, the laser power may need to be minimized and the spot diameter small to avoid overheating the airfoil.

Repairing or remanufacturing an airfoil 46 with blade repair assembly 50 may reduce distortion of airfoil 46 and may decrease manufacturing costs associated with repairing or remanufacturing airfoil 46.

Figure 7:
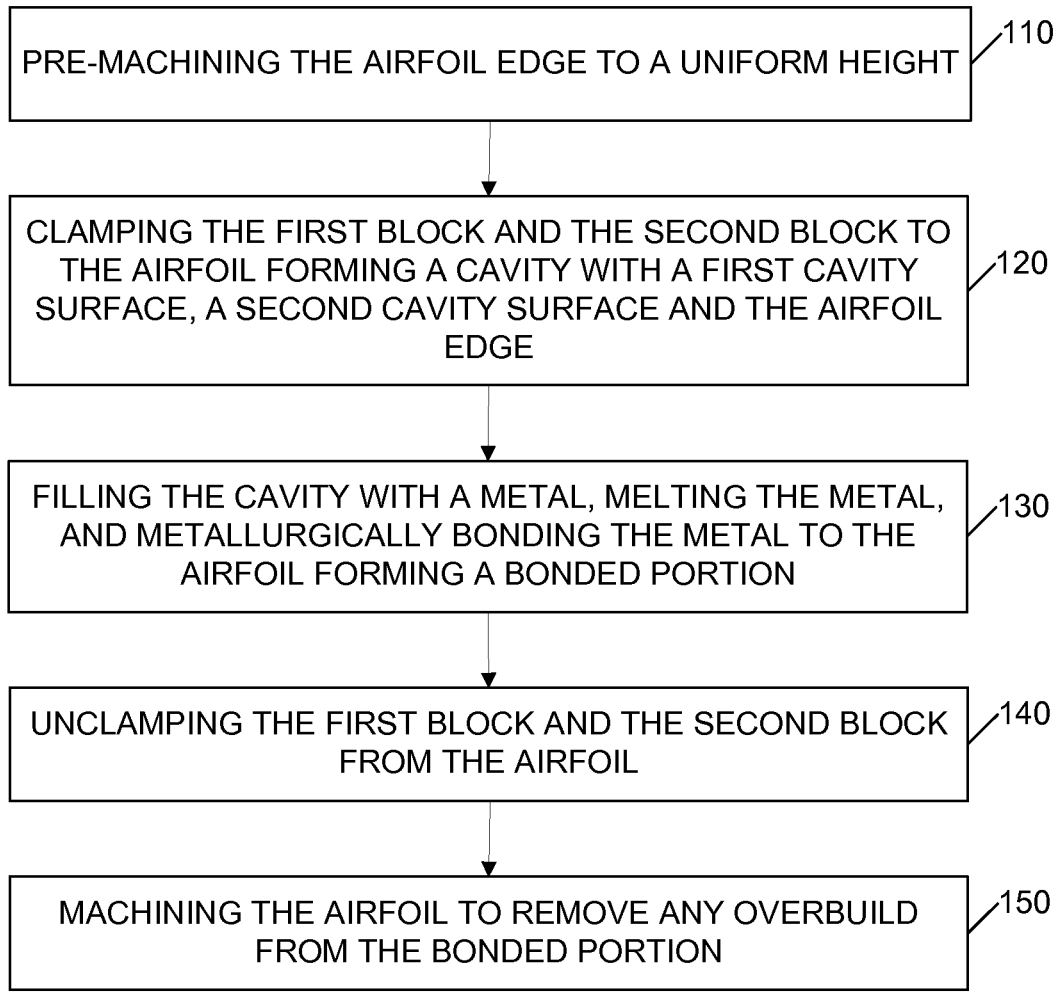
FIG. 7 is a flowchart of a method for repairing an airfoil with the blade repair assembly of FIGS. 4-5.

FIG. 7 is a flowchart of a method for repairing or remanufacturing an airfoil 46 with the blade repair assembly 50 of FIGS. 4 and 5. The method includes pre-machining the airfoil edge 47 to a uniform height at step 110. Pre-machining the airfoil edge 47 may simplify an automated tool path since the same amount of material may be added to each airfoil 46 to be repaired.

Step 110 is followed by clamping first block 60 and second block 70 to airfoil 46 forming a cavity 54 with a first cavity surface 64, a second cavity surface 74 and airfoil edge 47 at step 120. First cavity surface 64 and second cavity surface 74 may be angled to determine or control the amount of overbuild. The method may include selecting the amount of overbuild of bonded portion 48 by diverging first cavity surface 64 and second cavity surface 74 at a corresponding angle. The more first cavity surface 64 and second cavity surface 74 diverge, the more overbuild there may be. In one embodiment, first cavity surface 64 and second cavity surface 74 each diverge at an angle from five to twenty degrees. In another embodiment, first cavity surface 64 and second cavity surface 74 each diverge at an angle from five to ten degrees. Other angles may also be used. The use of first block 60 and second block 70 may further simplify an automated tool path by providing reference points for the tool path on first block 60 and second block 70.

Step 120 is followed by filling cavity 54 with a metal, melting the metal, and metallurgically bonding the metal to the airfoil 46 forming a bonded portion 48 at step 130. The metal may be melted and bonded using a welding process such as laser cladding, TIG welding, or micro plasma welding. When a laser cladding process is used, the spot diameter of the laser may be the same width or larger than the width of airfoil edge 47. Using a larger spot diameter and increasing the power of the laser may increase the build rate for forming bonded portion 48 and may decrease cycle time for building each layer in the laser cladding process. In embodiments using a laser, the laser may be an infrared laser.

The thermal diffusivity and reflectivity of first block 60 and second block 70 may prevent first block 60 and second block 70 from melting and welding to airfoil 46 during the welding process. First block 60 and second block 70 may also shield the remainder of airfoil 46, not along airfoil edge 47 from heat or from the metal bonding process.

The method may include cooling first block 60 and second block 70 with a cooling liquid such as water. A pump may supply or direct the cooling liquid to first side inlet channel 68 and second side inlet channel 78. The cooling liquid may pass through the channels and remove heat from first block 60 and second block 70, reducing the temperature of first block 60, second block 70 and airfoil 46. Liquid cooling first block 60 and second block 70 may further shield airfoil 46 from heat damage or distortion, and may prevent first block 60 and second block 70 from melting or welding to airfoil 46.

Step 130 is followed by unclamping first block 60 and second block 70 from airfoil 46 at step 140. Step 140 may be followed by machining airfoil 46 to remove any overbuild or excess material from bonded portion 48 at step 150. Controlling the overbuild with the angles of first cavity surface 64 and second cavity surface 74 may reduce the amount of material to be removed, reducing the machining time needed to machine airfoil 46.

The preceding detailed description is merely exemplary in nature and is not intended to limit the invention or the application and uses of the invention. The described embodiments are not limited to use in conjunction with a particular type of rotor blade. Hence, although the present disclosure, for convenience of explanation, depicts and describes compressor blades and turbine blades for a particular turbocharger, it will be appreciated that blade repair assembly and method for repairing compressor and turbine blades in accordance with this disclosure can be implemented in various other configurations, can be used with various other types of turbochargers, and can be used in other types of machines, such as gas turbine engines. Furthermore, there is no intention to be bound by any theory presented in the preceding background or detailed description. It is also understood that the illustrations may include exaggerated dimensions to better illustrate the referenced items shown, and are not consider limiting unless expressly stated as such.

What is claimed is:

1. A method for repairing a rotor wheel airfoil including an airfoil edge using a blade repair assembly including a first block including a first contact surface with a shape of at least a portion of the airfoil and a first cavity surface adjacent the first contact surface, and including a second block including a second contact surface with a shape of at least a portion of the airfoil and a second cavity surface adjacent the second contact surface, the first block and the second block each including a thermal diffusivity of at least one-hundred millimeters squared per second, the method comprising:
    pre-machining the airfoil edge to a uniform height;
    clamping the first block and the second block to the airfoil forming a cavity with the first cavity surface, the second cavity surface, and the airfoil edge, wherein the first and second cavity surfaces have angles from about five to twenty degrees which diverge from the cavity;
    filling the cavity with a metal including
        melting the metal, and
        metallurgically bonding the metal to the airfoil forming a bonded portion; and
    unclamping the first block and the second block from the airfoil.

2. The method of claim 1, further comprising cooling the first block and the second block with a liquid.

3. The method of claim 2, wherein cooling the first block and the second block with the liquid includes directing water through cooling channels located in the first block and the second block.

4. The method of claim 1, further comprising machining the airfoil to remove any overbuild from the bonded portion.

5. The method of claim 1, wherein metallurgically bonding the metal to the airfoil includes welding the metal to the airfoil with a laser cladding process.

6. The method of claim 5, further comprising melting the metal and metallurgically bonding the metal to the airfoil with a laser with a spot diameter larger than a width of the airfoil edge.

7. The method of claim 1, wherein clamping the first block to the second block includes fastening a first block forward tab of the first block to a second block forward tab of the second block, and fastening a first block aft tab of the first block to a second block aft tab of the second block.

8. A method for remanufacturing a rotor wheel for a turbocharger, the rotor wheel including an airfoil with an airfoil edge using a blade repair assembly including a first block and a second block, the method comprising:
    pre-machining the airfoil edge to a uniform height;
    clamping the first block to the second block, the first block including copper, a first contact surface with a first shape of at least a first portion of the airfoil, and a first cavity surface adjacent the first contact surface and the second block including copper, a second contact surface with a second shape of at least a second portion of the airfoil, and a second cavity surface adjacent the second contact surface to the airfoil forming a cavity with the first cavity surface, the second cavity surface, and the airfoil edge, wherein the first and second cavity surfaces have angles from about five to twenty degrees which diverge from the cavity;

filling the cavity with a metal including
welding the metal to the airfoil forming a bonded portion;

cooling the first block and the second block when filling the cavity with the metal;

unclamping the first block and the second block from the airfoil; and machining the airfoil including the bonded portion.

9. The method of claim 8, wherein machining the airfoil including the bonded portion includes removing any overbuild from the bonded portion.

10. The method of claim 8, further comprising removing the rotor wheel from a compressor housing prior to pre-machining the airfoil edge to a uniform height.

11. The method of claim 8, further comprising removing the rotor wheel from a turbine housing prior to pre-machining the airfoil edge to the uniform height.

12. The method of claim 8, wherein welding the metal to the airfoil forming the bonded portion includes laser cladding the metal to the airfoil.

13. A rotor wheel remanufactured by clamping a first block and a second block to the rotor wheel forming a cavity with a first cavity surface, a second cavity surface, and the rotor wheel and filling the cavity with a metal including metallurgically bonding the metal to the rotor wheel, the rotor wheel comprising:

a hub including an axial portion that curves to a radial portion; and an airfoil extending from the hub, the airfoil including
an airfoil edge, and
a bonded portion metallurgically bonded to the airfoil edge, the bonded portion including
a first side extending from the airfoil edge at a first angle, the first angle corresponding to an angle of the first cavity surface diverging from the cavity at an angle of about five to twenty degrees, and
a second side extending from the airfoil edge at a second angle, the second angle corresponding to an angle of the second cavity surface diverging from the cavity at an angle of about five to twenty degrees.

14. The rotor wheel of claim 13, wherein the airfoil includes a nickel based alloy.

15. The rotor wheel of claim 13, wherein the airfoil includes titanium.

16. The rotor wheel of claim 13, wherein the first side and the second side are machined flush to sides of the airfoil edge to form an airfoil profile.

17. The rotor wheel of claim 13, wherein the bonded portion also includes a forward side, adjacent the first side and the second side, extending from a leading edge of the airfoil at a third angle and an aft side, adjacent the first side and the second side, extending from a trailing edge of the airfoil opposite the forward side at a fourth angle.

* * * * *